United States Patent [19]

Bartlett et al.

[11] Patent Number: 4,782,521

[45] Date of Patent: Nov. 1, 1988

[54] COMMUNICATION TERMINAL CALL REMINDER WITH AUTOMATIC DIALING

[75] Inventors: Richard A. Bartlett, Middletown; Timothy A. Cole, Montclair; Esther L. Davenport, Dunellen, all of N.J.

[73] Assignee: AT&T Information Systems Inc. American Telephone and Telegraph Company, Murray Hill, N.J.

[21] Appl. No.: 118,361

[22] Filed: Nov. 6, 1987

Related U.S. Application Data

[63] Continuation of Ser. No. 830,210, Feb. 18, 1986, abandoned.

[51] Int. Cl.$^4$ .............................................. H04M 1/274
[52] U.S. Cl. ..................................... 379/354; 379/355; 379/387
[58] Field of Search ............... 379/355, 356, 354, 387, 379/396, 52, 388, 96, 90, 216, 61

[56] References Cited

U.S. PATENT DOCUMENTS

| 4,291,198 | 9/1981 | Anderson et al. | 379/357 |
| 4,431,870 | 2/1984 | May et al. | 379/357 |
| 4,481,382 | 11/1984 | Villa-Real | 379/61 |

OTHER PUBLICATIONS

IEEE Communications Magazine, Feb. 1985, vol. 23, No. 2, pp. 21-26, "An Interactive Touch Phone for Office Automation", Messrs. Hsing, Quach, LeBlanc and Stoddard.

Proc. ICC'84, Amsterdam, May 14-17, 1984, "An Interactive Touch Phone for Future Offices", by Messrs. Hsing, Quach, LeBlanc, Mednick and Abraham, pp. 272-275.

Personal Computing—A Hayden Publication, The Plus Edition, Mar. 1985, Advertisement pages and a Special Report Extract "'Lap' Portables—How Small is too Small?", pp. 83-97, E. Foster.

The Cypress Personal Communication Terminal from ROLM—Pamphlet Rolm Corporation.

Teleconnect—A Monthly Telecommunications Magazine, May 1985, pp. 143-163, Are Workstations Camels?, by editors, "A Week of Workstations", by B. Page.

Teleconnect—A Monthly Telecommunications Magazine, Jan. 1984, "Executive Workstations", K. Zita.

Primary Examiner—James L. Dwyer
Attorney, Agent, or Firm—Frederick B. Luludis

[57] ABSTRACT

A time manager for a personal terminal can be generally characterized as a things-to-do file in which the user inputs a to-do reminder message along with a data and time that the terminal user wants to be alerted (reminded). The notion of a terminal time manager is advanced by displaying reminder messages directed to calling a named entity that is contained in the terminal telephone directory and by automatically calling the named entity when the user points to the displayed reminder. If the user inputs the actual telephone number to be called in place of the named entity, then the telephone number will be called even though the telephone number is not contained in the directory.

5 Claims, 11 Drawing Sheets

FIG. 1

| LINE 1: IDLE | LINE 2: IDLE | | | | We Oct 16 1985 4:30p | |
|---|---|---|---|---|---|---|
| | | | DIRECTORY | | | |
| ANDERS 11 | JONES 12 | LOUIS 13 | MARX 14 | OZZLE 15 | PROVIS 16 | STUART 17 | ALPHA GROUP |

- ANDERSON, B
- ANDERSON, J · EVANS, A · · · · · HARRY
- BAXTER · · · · · · · · ·
- CHOMEX · · · · · · · · · JOHNSEN, A
- DAVE · · · · · · · JOHNSON, N

| PREV PAGE | NEXT PAGE | DIAL IT | DATA SCREEN | SHOW MODE * | EDIT DIRECTORY | NAME GROUPS | PRINT SCREEN |

COMMUNICATION TERMINAL CALL REMINDER WITH AUTOMATIC DIALING

CROSS-REFERENCE TO RELATED APPLICATION

This application is a continuation of application Ser. No. 830,210, filed Feb. 18, 1986 now abandoned.

TECHNICAL FIELD

This invention relates to an automatic call reminder message arrangement that is displayed on the screen of a communication terminal.

BACKGROUND OF THE INVENTION

Communication terminals, such as desk top computers, personal terminals and personal workstations, are often arranged to allow the user to create a personal telephone directory file and a reminder file. The directory file is typically a list of names and associated telephone numbers that are inputted by the user and stored in the directory file. The user may "look up" a particular telephone number by typing in the name, or a portion thereof. A terminal directory program receives the inputted name and searches for a match between it and an entry in the telephone directory. When the program finds such a match, it displays the name entry and sought-after telephone number. To place a call to the displayed telephone number, the user typically moves the cursor to the displayed telephone number and operates, for example, a "dial it" button.

A reminder file is typically a list of things to do that is composed by the user and stored in the reminder file along with a specified date and time. The user is alerted to an entry in the reminder file by a time manager program that is typically arranged to activate an audible alarm at the specified time. The user may then display the reminder list, with the current reminder being displayed, for example, as inverse video (highlighted).

SUMMARY OF THE INVENTION

We have recognized that prior reminder arrangements are often cumbersome and inefficient in that they require the terminal user to perform at least three or four terminal operations to invoke the action identified in a displayed reminder message. For example, if the reminder message reminds the user to call a particular person the user may have to (a) place the terminal in the directory mode, (b) input the name of the person, or entity, to obtain the telephone number thereof, (c) move the screen cursor to the telephone number when it is displayed, and (d) operate the "dial it" button to place a telephone call to the displayed number.

We have realized that a more desirable solution to such prior approaches is a one step approach that not only alerts the user to the action item by displaying it at a time selected by the user, but also automatically performs the action when the user "points" to the displayed reminder. (The meaning of the term "pointing to" is to include "touching a target" as that term is used herein and also includes other terms that describe a similar action, for example, such as when a terminal user points to one of a plurality of displayed file names by moving the screen cursor to the file name and brings up the file on the CRT by operating a terminal button, or such as when a terminal user points to an item displayed on the CRT of a terminal employing a non-optically-based touch screen.) Specifically, a preferred embodiment of the invention is adapted to recognize a keyword that may be included in an action reminder as a means of distinguishing various action reminders from each other. When an action reminder includes such a keyword, then the specific action to be performed is derived from information included in the reminder.

In accordance with a feature of the invention, the word "call" is used as the keyword and the terminal responds to messages that contain that keyword by performing the action of calling a telephone number derived from information included in the message. The information can either specify the name of the person, or entity, to be called as long as that name is an entry in the terminal telephone directory or specify the actual telephone number to be called.

BRIEF DESCRIPTION OF THE DRAWING

In the drawing,

FIG. 1 illustrates a directory screen and a banner field displayed on the CRT of a personal terminal embodying the principles of the invention;

DETAILED DESCRIPTION

Figure 2:
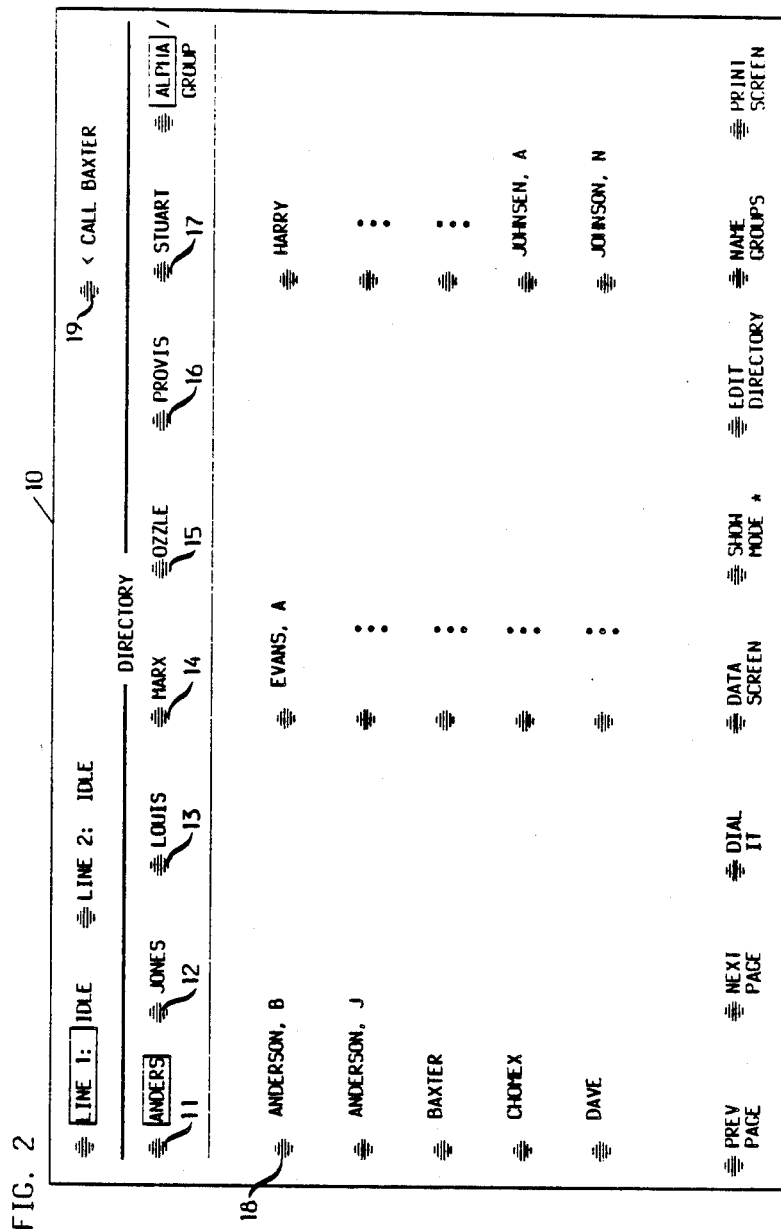
FIG. 2 shows the directory screen and banner field of FIG. 1 at a subsequent time, with the banner field now including a call reminder message.

FIG. 1 shows a local telephone directory screen displayed on the surface of the cathode ray tube (CRT) of a personal terminal—illustratively the AT&T Personal Terminal Model 510A (PT510A). The PT510A includes, inter alia, a telephone station set and handset which connect to either a telephone central office, private branch exchange or key telephone system via at least one telephone line. The PT510A also includes an optically-based touch sensitive CRT overlay of the type disclosed in U.S. Pat. No. 4,414,179 issued Nov. 20, 1984 to L. R. Kasday. The optically-based touch-sensitive overlay is a transparent, compliant surface which overlays the surface of the CRT and through which light from the CRT may pass and is used to determine the position of a finger touch on the surface of the CRT. The following discussion will be given in the context of the PT510A. However, it is to be understood by those skilled in the art of personal terminals that the invention may be practiced with various commercially available personal terminals, or workstations.

A full explanation of the functions performed by the PT510A is given in the AT&T Personal Terminal Model 510A User's Guide, which can be obtained from AT&T Customer Information Center, Commercial Sales Representative, P.O. Box 19901, 2855 North Franklin Road, Indianapolis, Ind. 46219, as Document No. 999-300-250IS, and which is incorporated herein by reference. For present purposes, however, it is sufficient to note that local directory screen 10 is displayed on the CRT whenever the user touches a touch target labeled DIRECTORY, which is one of a plurality of action blocks displayed along the bottom of a previously displayed screen (not shown). The telephone directory, which is stored in memory contained within the PT510A, is comprised of a plurality of records which comprise illustratively 105 names, associated telephone numbers and comments. (The above-mentioned User's Guide discusses how the PT510A terminal user enters names, telephone numbers and comments to create a personal telephone directory.) The names in the directory are displayed in groups of illustratively 15 names, each group of names being displayed in three columns of five names each. There is also displayed on directory screen 10 a plurality of symbols in the form of circles, each representing a touch target that may be touched by the user to activate, or invoke, a particular terminal function. For example, the user may place a call to the telephone number associated with the name ANDERSON, B by touching target 18. When that target is touched, the PT510A automatically causes a speakerphone to go off-hook and automatically dials the telephone number.

As described in the above-mentioned User's Guide, touch targets 11 through 17 and their associated labels serve as tabs, allowing the user to "bring up" a respective group of 15 names in the directory by touching the respective target.

Displayed across the top of screen 10 is a telephone and message banner field which comprises (a) targets for telephone line selection labeled as LINE 1 and LINE 2, (b) the status of each displayed line, the status of LINE 1 and LINE 2 each being IDLE, and (c) the current date and time. In practice, the displayed labels LINE 1 and LINE 2 are replaced by the telephone numbers of the telephone lines which connect to the PT510A. The status of the displayed telephone line, for example, the status IDLE, changes to ACTIVE when the associated line is off hook and changes to HOLD when the associated line is placed on hold by the user.

A reminder message entered by the user with a date and time entry is automatically displayed at the specified time in place of the date and time that is normally displayed in the banner field. Specifically, FIG. 2 shows directory screen 10 at a subsequent time in which the reminder message "call BAXTER" and target 19 are displayed in the banner field in place of the date and time, the name BAXTER being a name in the user's personal telephone directory as shown. In accordance with the invention, if the user chooses to call BAXTER, then all the user needs to do is to touch target 19, thereby invoking the displayed action. The PT510A thereupon automatically searches the user's telephone directory for the name BAXTER and automatically dials the telephone number associated with that name.

Figure 3:
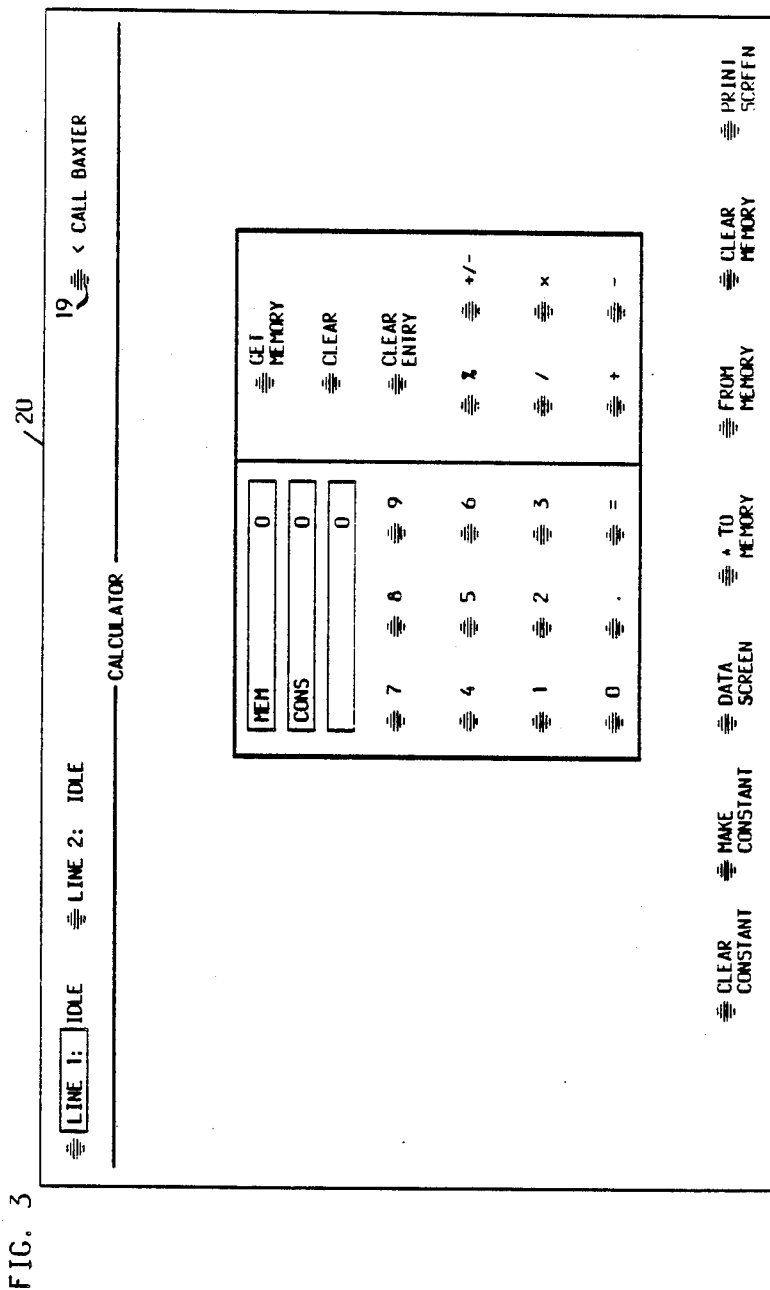
FIGS. 3 and 4 illustrate a calculator screen and banner field displayed on the CRT with the banner fields showing respective versions of call reminder messages.

The reminder message, or telephone calling information, is displayed regardless of which screen is being displayed on the terminal's CRT. For example, FIG. 3 shows calculator screen 20 which can be up on the CRT of the PT510A. It is seen from FIG. 3 that the reminder message "call BAXTER" replaces the date and time that is normally displayed in the banner field, as mentioned above. Again, all the user needs to do to place a telephone call to BAXTER is to touch target 19. It is noted that a reminder message is continuously displayed in the banner field until the terminal user acknowledges the message by touching target 19, shown in FIG. 3. At that time, the message is erased and the current date and time is brought up on the screen.

Figure 4:
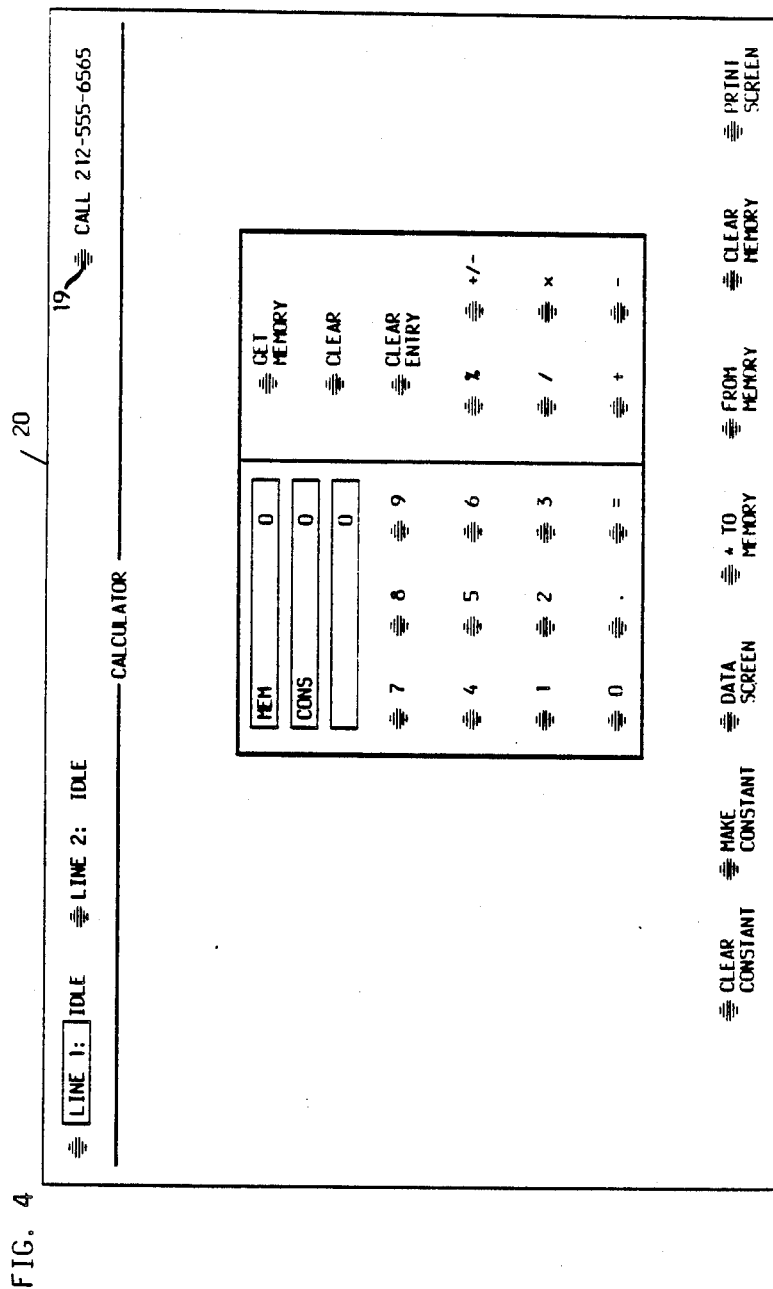

Occasionally, the user may have the need to enter a call reminder to a telephone number that is not contained in the terminal directory. On such occasions, the user may enter the telephone number in the terminal directory and then enter the reminder message. In accordance with a feature of the invention, however, the extra step of entering the telephone number in the directory can be eliminated by allowing the user to explicitly input in the reminder message the telephone number to be called. In particular, FIG. 4 shows another version of the PT510A calculator screen 20 in which a call reminder to telephone number 212-555-6565 is posted on screen 20 in place of the date and time. If the user chooses to call that number, then, as mentioned above, all the user needs to do is to touch target 19. Since the characters following the word call are numbers rather than letters, the program (discussed below) bypasses the step of searching the terminal directory and dials the displayed numbers.

Figure 5:
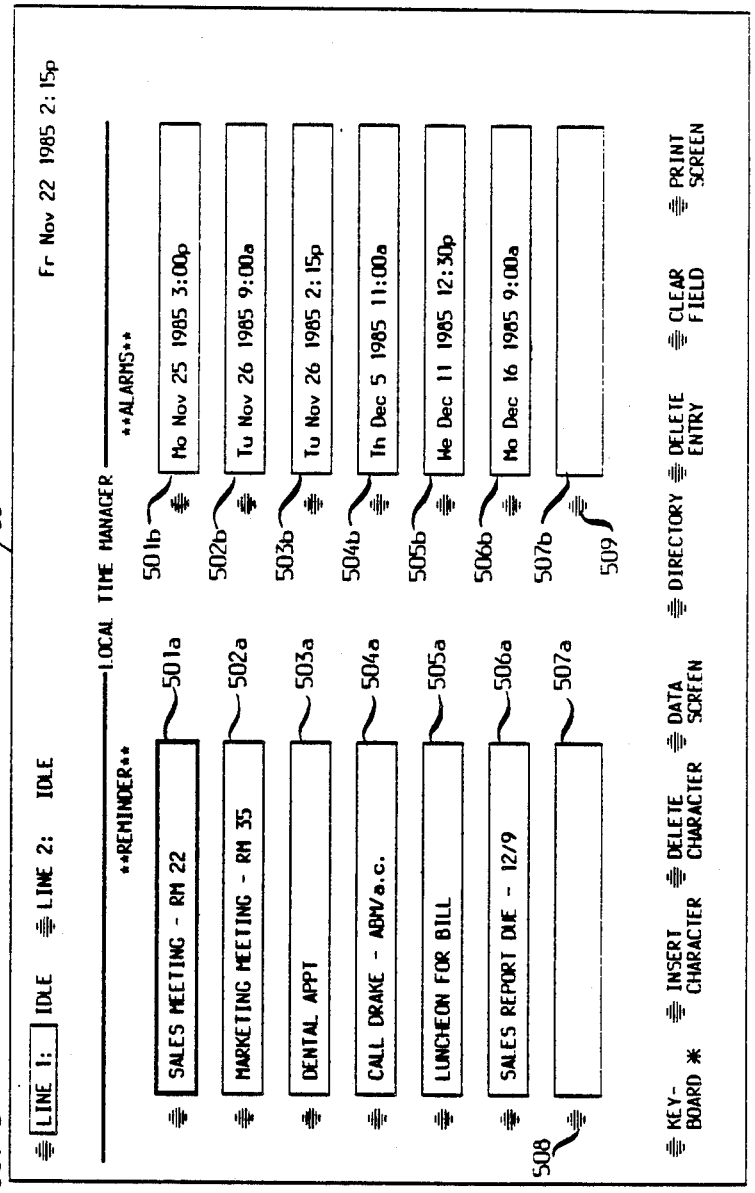
FIG. 5 illustrates a time manager screen and banner field displayed on the CRT.

Turning now to FIG. 5, there is shown LOCAL TIME MANAGER screen 30 arranged to display illustratively seven reminder messages comprising respective message fields 501a–507a and associated alarm fields 501b–507b. Since reminder field 504a contains the keyword call, the reminder "call DRAKE" will be displayed in the banner field at the time selected by the user, i.e., the time specified in alarm field 504b. Since the remainder of the reminder fields do not contain the keyword "call", i.e., the keyword "call" is not the first word in those fields, no attempt is made by the terminal to place a call when the user touches target 19. In this respect, the keyword "call" is used to distinguish a call reminder message (i.e., a telephone dialing function) from other reminder messages (i.e., nondialing functions), as mentioned above.

To enter a reminder message, such as an automatic call reminder message, the user selects an unused, or free, reminder field, such as field 507a, by touching its associated target 508. The user may then enter the text of the reminder message using the keyboard associated with the PT510A or a keyboard that is displayed, as discussed more fully below, when the user touches the target labelled KEYBOARD. Target 509 is then touched to enter an alarm time. When that target is touched, the PT510A displays the current date and time in alarm field 507b. The user edits the alarm field by moving the screen cursor through the displayed date and time and typing over the information as needed.

Figure 6:
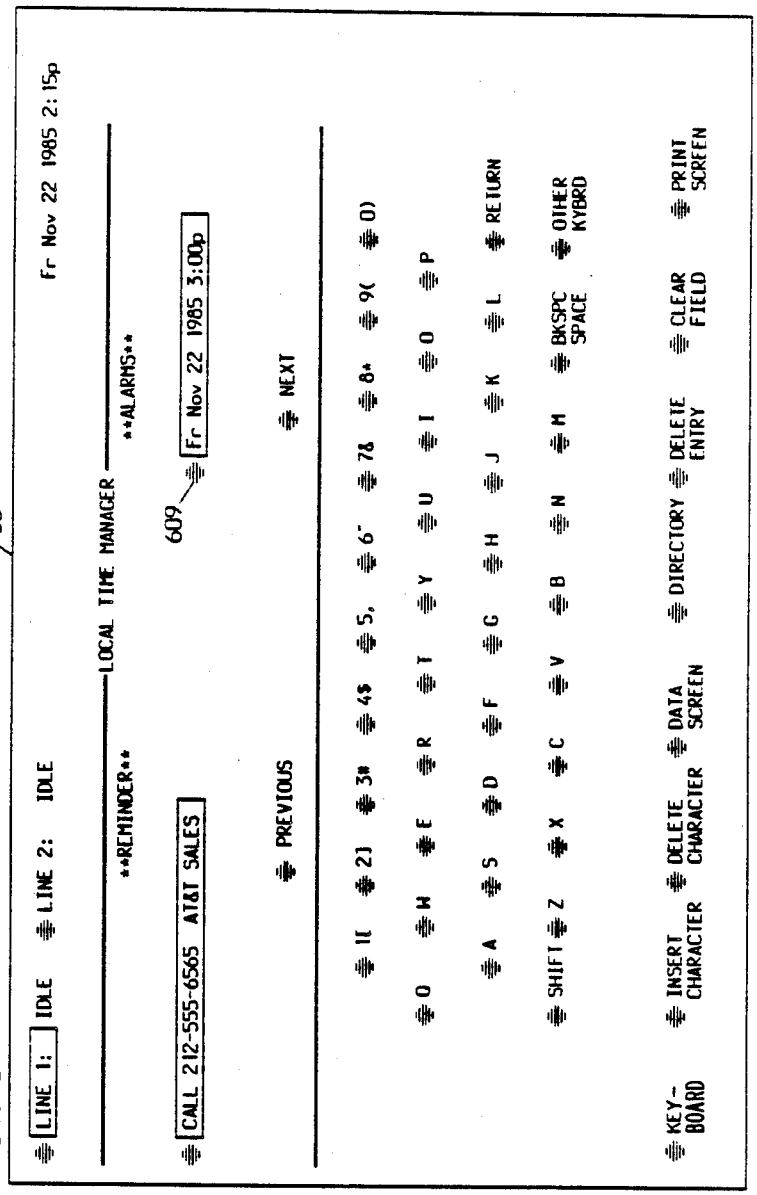
FIG. 6 shows the time manager screen of FIG. 5 in an editing mode with a keyboard displayed in a portion of the screen.

Turning now to FIG. 6, there is shown a second version of LOCAL TIME MANAGER screen 30 which is brought up with the displayed keyboard when the user touches the target labeled KEYBOARD shown at the bottom of FIG. 5. The displayed keyboard is actually displayed in two parts, the first part being shown in FIG. 6. The second part (not shown) is displayed when the user touches the target labeled OTHER KYBRD. The other keyboard is used for typing in characters and control signals, such as cursor control to move the screen cursor, commas, parentheses, and other characters and symbols that are normally associated with a standard keyboard.

To enter a reminder message, such as the call reminder message shown in FIG. 4, the user types in the word "call" using the displayed keyboard followed by a space and then the telephone number. To enter text to identify the telephone number, the user types in two spaces and then enters the identifying text, the two spaces being used to distinguish the identifying text from the inputted telephone number. In this example, the user enters:

call∧212-6565∧∧AT&T SALES (wherein the character ∧ is used to represent a space).

The user touches target 609 to edit the date and time at which the inputted call reminder message is to be displayed on the current screen. In response to the user touching target 609, the PT510A displays the current date and time and positions the cursor at the left-most character location in the alarm field. The date and time displayed in the alarm field may be edited to that shown in FIG. 6 by moving the screen cursor and typing over the displayed information as needed using the displayed keyboard. It is noted that the days of the week are abbreviated using Mo, Tu, We, Th, Fr, Sa and Su, respectively and months are abbreviated using Jan, Feb, Mar, Apr, May, Jun, Jul, Aug, Sep, Oct, Nov and Dec, respectively. AM and PM are abbreviated as a and p, respectively.

It is also noted that if a time and not a date is entered, then the inputted reminder message is displayed each day at the specified time. Also, if only the day of the week and time are entered, then the reminder message is displayed at the specified time on the specified day of each week, and so on.

Figure 7:
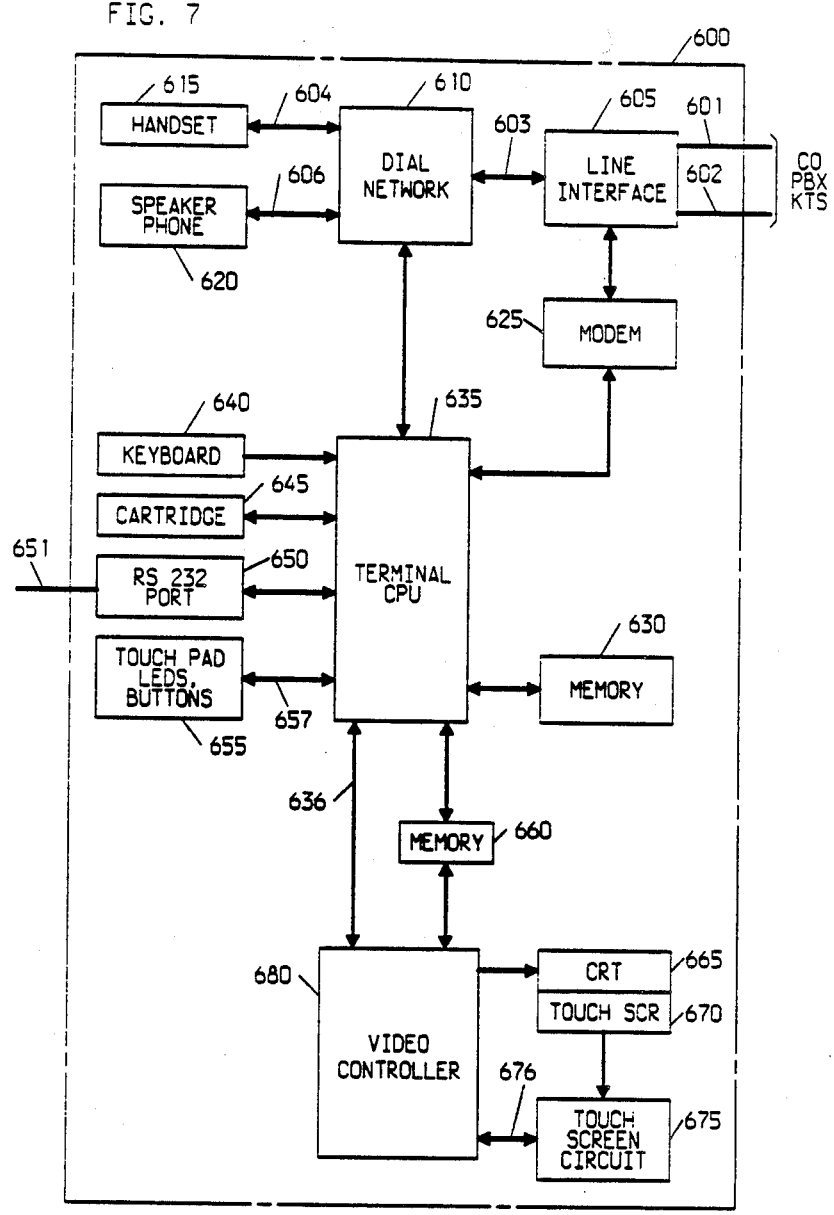
FIG. 7 is a block diagram of the personal terminal.

Referring now to FIG. 7, there is shown a broad block diagram of the PT510A. Terminal 600 includes a telephone section, video section, and I/O section all under control of terminal CPU 635. CPU 635 is a microprocessorbased circuit and includes gate arrays and I/O interface circuits (not shown). The gate arrays are arranged to provide inter alia (a) timing and clock signals, (b) time of day, (c) memory mapping to determine whether the memory being used is RAM, ROM or cartridge 645 memory, and (d) select signals to dial network circuit 610, modem 625, keyboard 640 and RS232-C port circuit 650. The I/O interface circuits contained within CPU 635 interfaces with (a) keyboard 640, (b) cartridge 645, (c) touch pad, light emitting diode and button circuit 655 and (d) RS232-C port circuit 650. Port circuit 650 is arranged to provide standard RS232-C control signals to a device, such as a printer, connected to serial data leads 651. CPU 635 is also arranged to (a) scan terminal buttons 655 via bus 657 to determine, for example, their status, (b) illuminate light emitting diodes 655 in response to a change in the status of, for example, terminal buttons 655, (c) switch dial network 610 from telephone handset 615 to speakerphone 620, and (d) provide terminal video functions, such as painting various screen patterns on CRT 665 via video controller 680. CPU 635 is further arranged to receive (a) keyboard signals from keyboard 640, (b) read the contents of cartridge memory 645, memory 645 being either RAM-based or ROM-based memory, and (c) send information that is displayed on CRT 665 to a printer that may be connected to serial data leads 651.

The telephone section of terminal 600 comprises line interface circuit 605, dial network circuit 610 and modem 625. Line interface circuit 605 may be connected to either a central office (CO), private branch exchange (PBX) or key telephone system (KTS) via telephone lines 601 and 602. Line interface circuit 605 is arranged to detect ringing and message waiting on lines 601 and 602 and is also arranged to provide the well known A-lead control. Line interface circuit 605 also includes switching circuitry for connecting dial network circuit 610 or modem 625 to one of the lines 601 or 602, respectively, in which modem 625 is always connected to line 602 when two lines are connected to the PT510A.

Dial network circuit 610 is arranged to inter alia (a) generate touch-tone signals, (b) provide dynamic switching between the microphone and loudspeaker of speakerphone 620, and (c) exchange information with CPU 635. Such information being, for example, the telephone number digits displayed as part of a call reminder message, in which each digit is passed from CPU 635 to dial network 610 for outpulsing over either line 601 or line 602.

Modem 625 can be, for example, a full duplex modem, such as the AT&T 212 modem, which can be connected to two-wire voice grade telephone lines, such as lines 601 and 602. Modem 625 comprises inter alia, seven write-only and three read-only registers that are addressable by CPU 635. The write-only registers are used to control modem 625 and to set its transmission parameters, such as baud rate and parity. The read-only registers are used to monitor the status of modem 625. To transmit data, for example, the transmission of asynchronous ASCII character data at 1200 baud, the data is converted to a synchronous data stream, scrambled and phase modulated to an analog signal by modem 625 and then passed to line 601 or line 602.

Analog data received via line 601 or 602 is processed through a modem 625 differential amplifier and band limited by a modem 625 receive filter. The detected carrier signal is amplified by a modem 625 automatic gain control circuit. A modem 625 timing recovery circuit extracts the symbol clock and the signal is converted to the well known TTL logic level. The data is then descrambled and converted to ASCII characters for passage to CPU 635.

The video section of terminal 600 comprises video controller 680, CRT 665, touch screen 670 and touch screen circuit 675. Video controller 680 under the direction of CPU 635 is arranged to display different patterns on CRT 665, such as screens 10, 20 and 30. In particular, CPU 635 stores information, which controls the pattern of the screen, in memory 660, the latter being comprised of ROM memory and RAM memory. The ROM portion of memory 660 stores the predetermined format of the screen, such as the name of the screen, touch targets, action blocks, etc. The RAM portion of memory 660 stores the dynamic entries that are displayed on the screen, such as names, telephone numbers, and reminder messages.

A screen is actually painted on CRT 665 by video controller 680 using the information stored in memory 660. Video controller 680 unloads the information stored at the locations identified by memory location pointers and displays the information on CRT 665.

Video controller 680 is also arranged to track the position of the CRT electron beam, as is done in light-pen arrangements, and to generate a signal each time a touch target is displayed on CRT 665. This signal is passed to touch screen circuit 675 via one of the leads 676.

As discussed earlier, optically-based touch screen 670 is used to determine the position of a finger touch over the surface of CRT 665 and is a transparent and parallel device for overlaying the face of CRT 665 and through which light from the CRT may pass. When a target is touched by the terminal user, light from the CRT raster beam becomes trapped within touch screen 670 by total internal reflection. This trapped light travels to an edge of touch screen 670 and is detected by photodetectors (not shown) mounted along the edge of touch screen 670. Since internal reflection occurs at the time the CRT raster beam passes under the finger, the raster beam timing (as performed by video controller 680) is used to determine the position of the touch. The position (i.e., x and y coordinates of the CRT raster beam) of the touch is passed to CPU 635 via bus 636. CPU 635 interprets the x and y coordinates of the touch point to determine if a touch target is displayed at that location. If a touch target is being displayed at the relevant coordinates, then CPU 635 takes appropriate action commensurate with the function of the touch target, such as dialing the telephone number displayed with a call reminder message.

Some light from the CRT electron beam always becomes trapped within touch screen 670. The level of light from an untouched target is lower, however, than the level of light that becomes trapped within touch screen 670 when a target is touched. Touch screen circuit 675 is a voltage threshold circuit that is arranged to distinguish between signals which are outputted by touch screen 670 when a target is touched and signals which are outputted when a target is not touched. Touch screen circuit 675 notifies video controller 680 over one of the leads 676 whenever it determines that such signals are the result of a touched target. Touch screen circuit 675 is further disclosed in copending U.S. patent application Ser. No. 715,278 to P. S. DiPiazza et al.

The PT510A operating system is a multitasking program which invokes various application programs on a priority basis, in which control of CPU 635 is given to an application program, or process, when it is entered.

Figure 8:
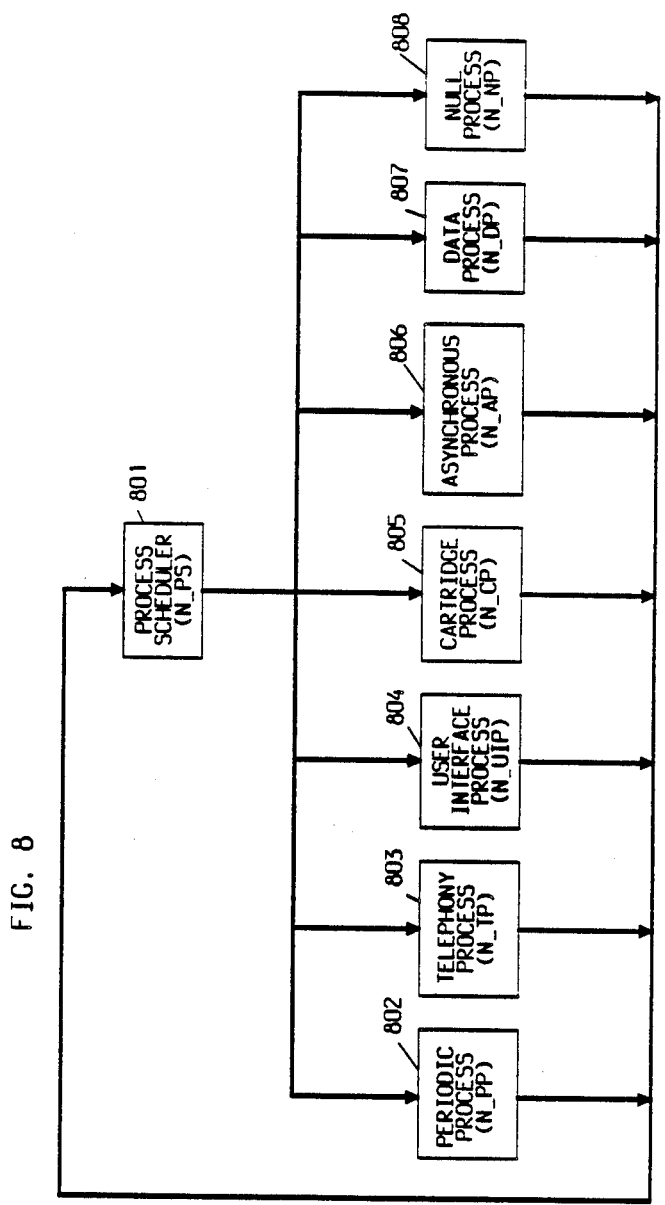
FIG. 8 is a program flow chart detailing the main program used within the terminal of FIG. 7.

FIG. 8 is a simplified flow chart depicting those aspects of the PT510A operating system that are relevant to the present invention. In particular, the scheduling of application processes 802 through 808 is done by process scheduler 801 and is based on priority, as mentioned above. Blocks 802 through 808 are shown in their order of priority (left to right), periodic process 802 being assigned the highest priority and null process 808 being assigned the lowest priority. Process scheduler 801 also enters, or invokes, one of processes 802 through 808 on an interrupt basis in response to, for example, the end of a predefined interval of time or upon receiving light pen coordinates from video controller 680. Each of the processes 802 through 808 has a dedicated input queue assigned to it for the storage of data, or information, such information being illustratively in the form of messages. When a process is entered it checks its queue and processes the data and messages contained therein. Otherwise, the process exits if its queue is empty.

Periodic process 802 is a table driven program that executes one task of a table of illustratively twenty tasks each time it is entered, process 802 being entered on an interrupt basis at the end of a predefined interval of illustratively five milliseconds in duration. One of the tasks performed by periodic process 802 is the task of incrementing a counter stored in memory 630 and of directing scheduler 801 to enter asynchronous process 806 when the contents of the counter reaches ten. Asynchronous process 806 is thus entered at least once each second to administer the date and time that are displayed in the banner field, as discussed below.

Another task executed by periodic process 802 is the task of processing light pen coordinates that it receives from video controller 680. It is noted that typically a pattern, such as a target, is painted on the surface of CRT 665 once each video frame. The fact that the user touches the target is detected by touch screen circuit 675 each video frame during the duration of the touch. Touch screen circuit 675 is arranged to filter out the first illustratively four or five frames of such detection as a debouncing mechanism and thereafter to report such detection to video controller 680. Periodic process is programmed not to react to the reception of light pen coordinates until it has received the same coordinates from video controller at least four times. On the fourth reception of such coordinates, periodic process 802 determines if the coordinates match the coordinates of a displayed target. Process 802 disregards the coordinates if such a match is not found. Otherwise, it passes the coordinates of the touched target to either asynchronous process 806 if they happen to be located in the banner area of the screen or to user interface process 804 if they happen to be located in another area of the screen.

Telephony process 803 when it is entered performs a telephone dialing function in response to finding a telephone number message that is stored in its queue. For example, when the user touches target 19 of a displayed call reminder message, user interface process 804 forms the pertinent telephone number into a message and stores it in the queue assigned to process 803. Telephony process 803 then passes the telephone number, one digit at a time, to dial network circuit 610 for outpulsing over one of the lines 601 or 602. Process 803 also performs interdigit timing to emulate the manner in which a telephone is typically dialed from a telephone station set.

Telephony process 803 is also programmed to switch dial network circuit 610 between handset 610 and speakerphone circuit 620 when it finds a message in its queue to do so, such messages being formed by null process 808, as discussed below.

User interface process 804 when it is entered paints most of the PT510A screen, such as screen 10, 20, and 30, on CRT 665 in response to various messages that it finds in its queue, for example, messages that are formed by periodic process 802 in response to the user touching respective displayed targets, as mentioned above. Process 804 is also invoked to provide directory and time manager editing functions, such as when a new name and telephone number are entered in the telephone directory or when a new call reminder message is entered in the list of call reminders.

Cartridge process 805 when it is entered by scheduler 801 either copies information stored in memory 630 into RAM-based cartridge 640 or copies information stored in RAM-based cartridge 640 into memory 630, the former information being, for example, directory information and the latter information being, for example, an application program.

Asynchronous process 806 when it is entered controls the display of the date and time in row 0 of the screen banner field. For example, it updates the date and time and also displays reminder messages at the specified time in place of the date and time, as discussed below.

Data process 807 is entered when a PT510A data screen is brought up and responds to the user touching various targets displayed on the data screen, such as targets directed to establishing a data connection between the PT510A and a host computer connected to one of the lines 601 or 602 (as discussed in the above referenced Users Guide).

Null process 808 is a fill in process and is entered by scheduler 801 when none of the other processes 802 through 807 are ready to run. Null process 808 when entered scans the top row of PT510A buttons, the latter comprising the (a) touchtel screen button which causes the touchtel screen to be displayed, (b) privacy on/off button which places the PT510A in a privacy mode, (c) speakerphone button which connects speakerphone 620 to one of the lines 601 or 602 via dial network 610, as mentioned above, and (d) microphone on/off button which mutes the microphone during speakerphone calls. When null process 808 determines that one of these buttons has been operated by the user it forms a message indicative of that fact and stores the message in the queue assigned to user interface process 804 for processing.

Figure 9:
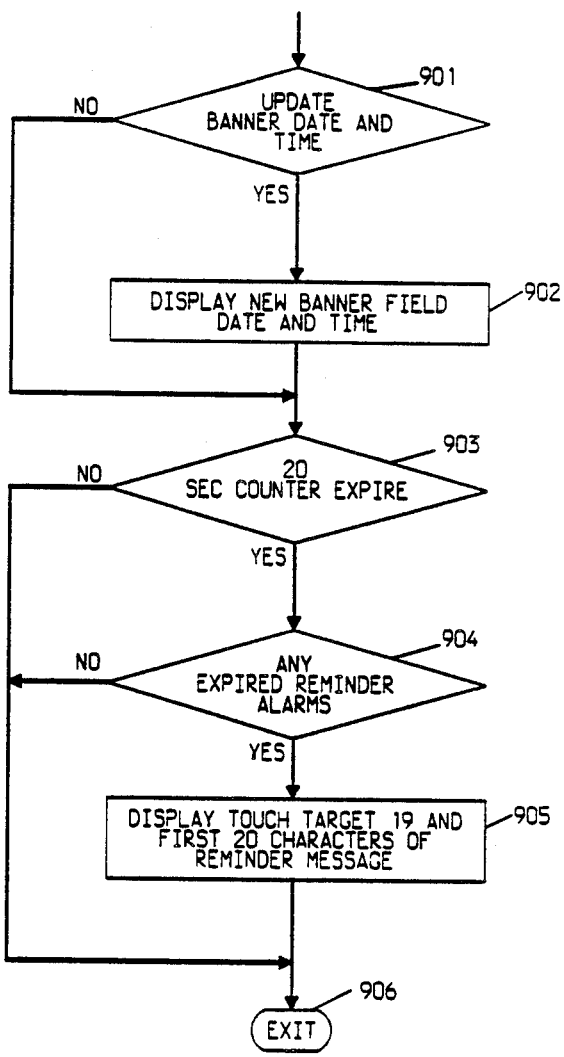
FIG. 9 is a program flow chart that is entered by the program of FIG. 8 to paint either the date and time or a reminder message on the screens of FIGS. 1, 2, 3, and 4 on the CRT of the terminal of FIG. 7.

Turning now to FIG. 9, there is shown in flow diagram form the program contained within asynchronous process 806 which updates the date and time that is displayed in the screen banner field and which brings up reminder messages in place of the date and time at the time specified by the user.

At block 901, asynchronous process 806 determines if it needs to update the date and time that is displayed in the banner field. The banner field date and time somewhat tracks the time kept by the PT510A's real time clock and is updated each time the real time clock advances by one minute. The program proceeds to block 902 to update the banner field date and time if the determination performed at block 901 is affirmative, otherwise the program proceeds to block 903.

At block 903, asynchronous process increments a counter and tests the value contained therein to determine if it has reached a predetermined threshold, the threshold being indicative of an elapse of twenty seconds. If this determination is affirmative, then the program zeroes out the counter and proceeds to block 904, otherwise the program exits at 906.

At block 904, the program compares the current date and time with the alarm time associated with each of the seven reminder messages, if any. The program proceeds to block 905 if a match is found, otherwise it exits via 906. At block 905, the program displays target 19 and the first twenty characters of the reminder message associated with the matched alarm in place of the date and time that are normally displayed in the banner area, as mentioned. Block 905 also generates an audible tone to alert the user to the displayed reminder message. Asynchronous process exits via 906 upon completing this task.

The processing of a reminder message whose alarm time has expired calls into play at least periodic process 802 and asynchronous process 806 and may also call into play user interface process 804 and telephony process 803 if the expired reminder message happens to be a call reminder message.

Figure 10:
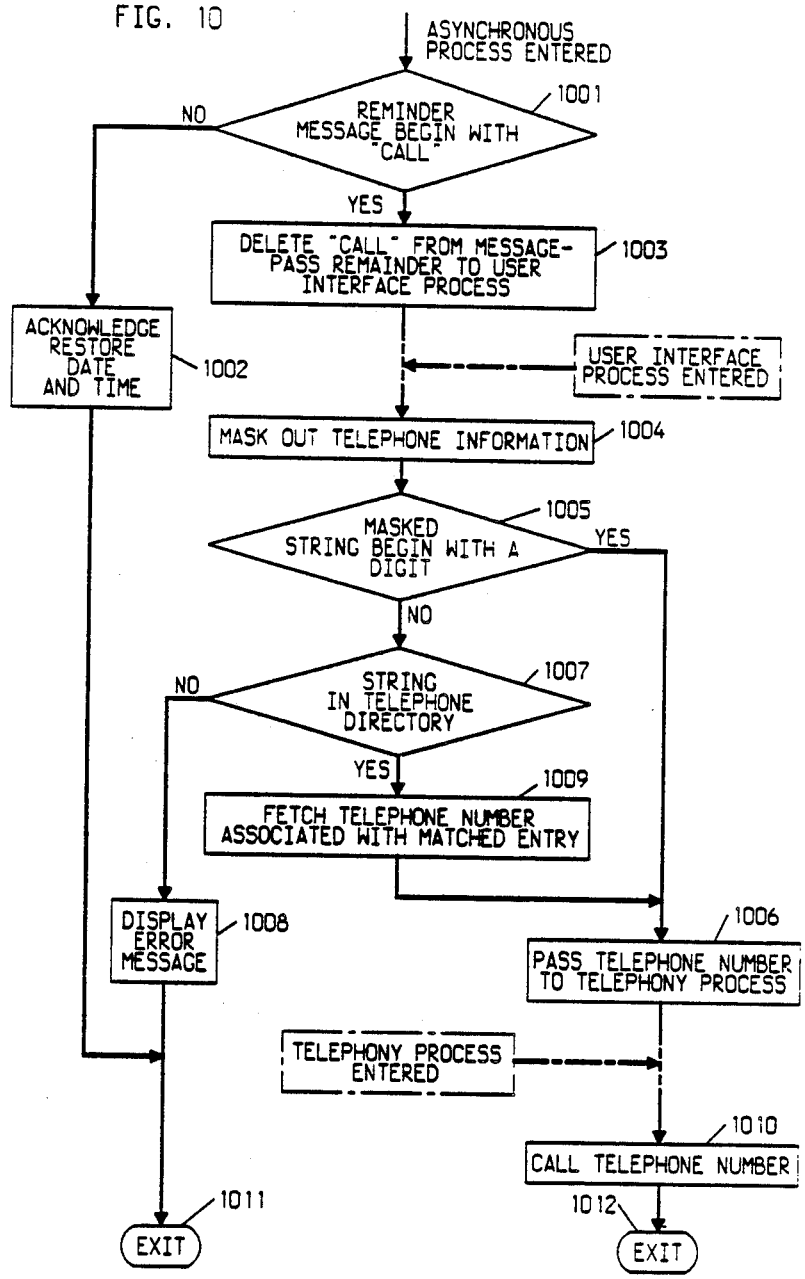
FIG. 10 is a program flow chart that is entered by the program of FIG. 8 to process call reminder messages.

Turning now to FIG. 10 there is shown in flow diagram form the interaction between processes 806, 804 and 803 that occurs in handling a reminder message that is displayed on the current screen. Asynchronous process 806 is entered when periodic process 802 determines that the user has touched target 19. At block 1001, asynchronous process 806 determines if the first word in the pertinent reminder message is the keyword "call" and proceeds to block 1003 if the determination is affirmative. Otherwise, process 806 transfers to block 1002 where it erases target 19 and the reminder message from the current screen and brings up the current date and time, as mentioned above.

At block 1003, asynchronous process 806 deletes the keyword "call" from the message and stores the remainder of the message in the queue assigned to user interface process 804. Process 806 exits (not shown) upon completing this task.

User interface process 804, when it is entered by process scheduler 801, unloads the message from its queue and, as illustrated at block 1004, removes (masks out) the telephone information. At block 1005, the masked string of telephone information is tested to determine if the first character in the string is a digit. If this proves to be affirmative the program transfers to block 1006. Otherwise, the program proceeds to block 1007 whereat the masked telephone information is compared with the name entries stored in the PT510A telephone directory. If the telephone information does not match a directory name entry, then an error message is brought up on the screen at block 1008, thereby alerting the user to that fact. Otherwise, the program proceeds to block 1009.

At block 1009, the telephone number associated with the matched directory name entry is unloaded from the directory. At block 1006, the telephone number is formed into a message and is stored in the queue assigned to telephony process 803.

Telephony process 803, as illustrated by block 1010, unloads the telephone message from its queue and passes the telephone number, one digit at a time, to dial network 610 for outpulsing over one of the lines 601 or 602, as mentioned above. Telephony process exits via illustratively exit point 1012 when it has completed the task of dialing the call reminder telephone number.

Figure 11:
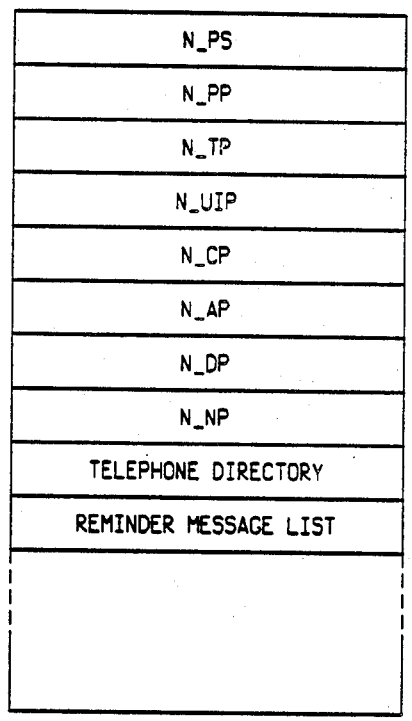
FIG. 11 illustrates a portion of memory contained within the terminal of FIG. 7 in which is stored the programs of FIGS. 8, 9 and 10 along with a telephone directory and a list of time manager messages.

FIG. 11 illustrates a layout of the application processes of FIG. 8 stored in memory 630 and also illustrates the memory layout of the name and telephone number directory and reminder message list.

The foregoing merely illustrates the principles of our invention. Those skilled in the art will be able to devise numerous arrangements which, although not explicitly shown or described herein, embody those principles and are within its spirit and scope.

What is claimed is:

1. An arrangement for a terminal having a display comprising
    means for storing information inputted by a user of said terminal, said information including a telephone number and selectively including a common keyword indicative of a dialing function to be performed by said terminal,
    means for displaying said information as a message at a time selected by said user, and means responsive to said user pointing to said displayed message for dialing said telephone number over a telephone line connected to said terminal if said displayed message includes said keyword.

2. A call reminder dialing arrangement for a display terminal having a telephone line connected thereto comprising means for storing calling information including a time entry and a name inputted by a user of said terminal, said name being inputted in place of a respective telephone number, said calling information selectively including a common keyword indicative of a dialing function to be performed by said terminal, means for displaying on the display of said terminal said calling information at the time specified by said time entry as a call reminder message, and means responsive to said user pointing to said displayed call reminder message and to said keyword being contained in said message for deriving said telephone number from said name and for dialing said number over said telephone line.

3. The arrangement set forth in claim 2 wherein said terminal includes means for storing a telephone number directory comprising a plurality of names and respective telephone numbers, and wherein said name and said derived telephone number are contained in said telephone directory.

4. The arrangement set forth in claim 2 wherein said means for dialing includes means responsive to said keyword being contained in said message for distinguishing said call reminder message from a noncall reminder message.

5. A call reminder message arrangement for a display terminal comprising means for storing a plurality of messages and respective time entries inputted by a user of said terminal, individual ones of said messages including respective telephone numbers and selectively including a common keyword indicative of a dialing function to be performed by said terminal, means for displaying each of said messages as a call reminder message when its respective time entry coincides with the time of day, and means responsive to said user pointing to a displayed call reminder message containing a telephone number for dialing said telephone number over a telephone line connected to said terminal if said common keyword is contained in said displayed message.

* * * * *